United States Patent
Thetford

(10) Patent No.: US 7,361,692 B2
(45) Date of Patent: *Apr. 22, 2008

(54) DISPERSANTS

(75) Inventor: Dean Thetford, Manchester (GB)

(73) Assignee: The Lubrizol Corporation, Wickliffe, OH (US)

( * ) Notice: Subject to any disclaimer, the term of this patent is extended or adjusted under 35 U.S.C. 154(b) by 208 days.

This patent is subject to a terminal disclaimer.

(21) Appl. No.: 10/474,306

(22) PCT Filed: Mar. 15, 2002

(86) PCT No.: PCT/GB02/01266

§ 371 (c)(1),
(2), (4) Date: Oct. 7, 2003

(87) PCT Pub. No.: WO02/085507

PCT Pub. Date: Oct. 31, 2002

(65) Prior Publication Data

US 2004/0112250 A1    Jun. 17, 2004

(30) Foreign Application Priority Data

Apr. 20, 2001 (GB) ................ 0109708.8

(51) Int. Cl.
- *B01F 17/16* (2006.01)
- *B01F 17/34* (2006.01)
- *B01F 17/52* (2006.01)
- *C08G 63/64* (2006.01)
- *C09D 11/00* (2006.01)

(52) U.S. Cl. ............ 516/27; 516/67; 516/69; 516/203; 106/504; 106/505; 558/180; 524/538; 524/539; 523/160; 523/161

(58) Field of Classification Search ........ 516/24, 516/56, 98, 199, 27, 67, 69, 203; 106/504, 106/505; 558/180; 528/355, 356; 525/538; 524/539, 538; 523/160, 161

See application file for complete search history.

(56) References Cited

U.S. PATENT DOCUMENTS

| 3,301,824 | A | 1/1967 | Hostettler et al. ......... 528/354 |
| 5,536,445 | A | 7/1996 | Campbell et al. ............ 516/59 |
| 5,700,395 | A | 12/1997 | Thetford et al. ............. 516/31 |
| 5,824,333 | A | 10/1998 | Scopelianos et al. ........ 424/423 |
| 5,914,072 | A * | 6/1999 | Zirnstein et al. ............ 516/57 |
| 2003/0181544 | A1 * | 9/2003 | Thetford et al. ............ 523/160 |

FOREIGN PATENT DOCUMENTS

| EP | 0628587 | | 12/1994 |
| EP | 0682054 | | 11/1995 |
| JP | 09194585 A | * | 7/1997 |
| WO | WO 98/19784 | | 5/1998 |
| WO | WO 99/49963 | | 10/1999 |
| WO | WO 99/55762 | * | 11/1999 |
| WO | WO 01/21298 | | 3/2001 |

OTHER PUBLICATIONS

JPO, Patent Abstracts of Japan, Japan patent Office, JP 09-194585 A, (DAICEL), abstract, pp. 1-2, (Jul. 1997) http://www19.ipdl.ncipi.gp.jp/PA1/cgi-bin/PA1INDEX.*
Machine translation for JP 09-194585 A, (DAICEL), pp. 1-15, (Nov. 2005), http://www19.ipdl.ncipi.go.jp/PA1/cgi-bin/PA1INDEX.*
Derwent Abstract on WEST, week 199740, London: Derwent Publications Ltd., AN 1997-431534, Class A23, JP 09-194585 A, (DAICEL), abstract.*

* cited by examiner

*Primary Examiner*—Daniel S. Metzmaier
(74) *Attorney, Agent, or Firm*—Samuel B. Laferty; Michael F. Esposito

(57) ABSTRACT

A dispersant comprising a polyester chain obtainable by polymerising a hydroxy carboxylic acid or lactone thereof such as E-caprolactone with a cyclic alkylene carbonate such as 5,5-dimethyltrimethylene carbonate. The dispersant may be in the form of a phosphate ester where the polyester chain is reacted with a phosphating agent such as polyphosphoric acid or the polyester chain may be attached to a polyamine or polyimine such as polyethyleneimine.

8 Claims, No Drawings

DISPERSANTS

The present invention relates to novel dispersants containing the residue of a cyclic alkylene carbonate, to dispersions containing such dispersants with a particulate solid and a liquid medium, to millbases and the use of such dispersions and millbases in paints, printing inks and plastics materials, including inks for non-impact printers such as "drop-on-demand" (DOD) printers.

Dispersants are continuously sought which have higher fluidity under adverse storage conditions because of their ease of handling. Furthermore, dispersants are also sought which are capable of dispersing higher amounts of particulate solids such as pigments in an organic liquid medium and which result in paints and inks which exhibit superior properties such as improved gloss.

EP 164, 817 discloses dispersants which are phosphate esters of a polyester obtained by polymerising a hydroxycarboxylic acid such as 6-hydroxycaproic acid or ε-caprolactone.

WO 98/19784 discloses dispersants which contain a polyoxyalkylene carbonyl chain (hereinafter POAC chain) which is derived from optionally alkyl-substituted ε-caprolactone and δ-valerolactone. The POAC chain may contain a terminating carboxylic group which is reacted with polyamines such as polyethyleneimine to give basic dispersants or the POAC chain may contain a terminating hydroxy group which may be esterified to give an acidic dispersant. It has now been found that other useful dispersants may be obtained where the POAC chain is derivable from one or more hydroxycarboxylic acids or lactone thereof and one or more cyclic alkylene carbonates.

According to the invention there is provided a dispersant of formula 1, including salts thereof $$T-X-(A)_m-(B)_n-Z \qquad 1$$

wherein

T is hydrogen or the residue of a polymerisation terminating group;

X is a direct bond or divalent bridging group;

A is the residue of one or more optionally substituted $C_{1-50}$-alkylene or $C_{2-50}$-alkenylene hydroxycarboxylic acids or lactones thereof;

B is the residue of one or more optionally substituted cyclic alkylenecarbonates;

Z is an acidic or basic group or a moiety which contains an acidic or basic group such that when Z is a basic group or a moiety containing a basic group, the group $T-X-(A)_m-(B)_n-$ is attached to Z by amide and/or salt linkages;

m and n are positive integers; and m+n is from 2 to 200.

When Z is multivalent there may be more than one POAC chain represented by $T-X-(A)_m-(B)_n-$ attached to each Z and these POAC chains may be the same or different.

The POAC chain represented by $-(A)_m-(B)_n-$ may be that of a block or random co-polymer but is preferably that of a random copolymer. It is also to be understood that either A or B may be attached to the group T—X. The POAC chain represented by $T-X-(A)_m-(B)_n-$ may carry a hydroxy or carboxy end-group by which it is attached to Z, depending on the nature of the polymerisation terminating group T. These are referred to hereinafter as TPOAC alcohol and TPOAC acid, respectively.

When X is a divalent linking group it is preferably —S—, $-NR^1-$ (wherein $R^1$ is hydrogen or $C_{1-20}$-alkyl) or especially —CO— or —O—.

The polymerisation terminating group T is preferably optionally substituted $C_{1-50}$-hydrocarbyl which may be aryl, heteroaryl, alkyl, alkenyl or cycloalkyl. The alkyl and alkenyl groups may be linear or branched.

When T is substituted, the substituent may be one or more atoms of oxygen, sulphur, nitrogen or halogen. Thus, T may contain one or more ether, thio ether, amine, carbonamide, urethane, ester (ie —OCO— or COO— groups), sulphone or sulphonamide groups. When T is substituted by halogen, it is preferably fluorine, bromine or especially chlorine. When T is substituted by oxygen, the substituent may be alkoxy, especially $C_{1-6}$-alkoxy.

When T is aryl it is preferably phenyl or naphthyl and when T is heteroaryl, it is preferably thienyl. It is, however, much preferred that T is alkyl, alkenyl or cycloalkyl.

T—X— may be the residue of an optionally substituted aliphatic alcohol, T—OH, the residue of an optionally substituted aliphatic mercaptan, T—SH, the residue of an optionally substituted amine $T-NHR^1-$ or the residue of an optionally substituted aliphatic acid, T—COOH.

When T is substituted, the substituent is preferably halogen, tertiary amino or alkoxy. It is preferred, however, that T is unsubstituted.

Examples of T—OH are methanol, ethanol, n-butanol, n-octanol, n-nonanol, n-decanol, n-dodecanol, oleyl alcohol, stearyl alcohol, isopropanol, isobutanol, tert-butanol, 2-ethylbutanol, 3-heptanol, 2-ethylhexanol, 3,5,5-trimethylhexanol, 3,7-dimethyloctanol and the so-called Guerbet alcohols such as those which are commercially available under the trade-name Isofol (ex Condea GmbH) including mixtures thereof. Specific examples of Guerbet alcohols are Isofol 12, 14T, 16, 18T, 18E, 20, 24, 28, 32, 32T and 36.

Examples of $T-NHR^1$ are ethylamine, butylamine, n-octylamine, 1,5-dimethylhexylamine, tert-octylamine, 2-ethylhexylamine, di-isopropylamine, 2-methylbutylamine, 1-ethylpropylamine, bis (2-ethylhexylamine), 1,3-dimethyl butylamine, 3,3-dimethylbutylamine, 2-aminoheptane and 3-aminoheptane.

Examples of T—COOH are methoxyacetic acid, lauric acid, stearic acid, ricinoleic acid, 2-ethylbutyric acid, 2-ethylhexanoic acid, 2-butyloctanoic acid, 2-hexyldecanoic acid, 2-octyldodecanoic acid and 2-decyltetradecanoic acid. Branched chain aliphatic acids of this type are commercially available under the trade name Isocarb (ex Condea GmbH). Specific examples are Isocarb 12, 16, 20, 28, 32, 34T and 36.

When T—COOH contains more than one ether group it is preferably a poly alkylene glycol alk(en)yl carboxy alkyl ether such as an Akypo acid as commercially available from Kao Chemicals GmbH. The Akypo acids have the formula RO(PEG) $CH_2$ COOH where R is $C_{6-20}$-alkyl and PEG is the residue of polyethylene glycol. Many of these are commercially available as mixtures. Specific examples are Akypo RLM 45, RO 50 VG, RO 90 VG and LF2.

When T is cycloalkyl it is preferably cyclohexyl. Thus, T may be the residue of cyclohexanol, cyclohexylamine, cyclohexylmercaptan or cyclohexyl carboxylic acid.

When T is alkyl substituted by one or more ether groups, it is preferably a polyalkylene glycolmonoalkylether, especially one having a number average molecular weight of less than 600. The alkyl group of the monoalkylether is preferably $C_{1-10}$-alkyl and especially $C_{1-6}$-alkyl. It is preferred that the polyalkyleneglycol is derived from propyleneoxide and/or ethyleneoxide. Polyalkyleneglycols derived from ethyleneoxide alone are preferred. Specific examples are polyethyleneglycol (350) monomethylether, triethyleneglycolmonomethylether and the ethoxylated Guerbet alcohols.

The polymerisation terminating group T may also be the residue of a hydroxy carboxylic acid similar to that from which A is derived such as glycolic acid.

Preferably, T contains not greater that 40, more preferably not greater than 30 and especially not greater than 20 carbon atoms.

It is also preferred that T is the residue of an aliphatic carboxylic acid or an aliphatic alcohol.

Preferably, the alk(en)ylene group in A contains not greater that 40, more preferably not greater than 30, even more preferably not greater than 20 and especially not greater than 10 carbon atoms. Examples of hydroxycarboxylic acids from which A may be obtained are glycolic acid, lactic acid, ricinoleic acid, 6-hydroxycaproic acid, 5-hydroxyvaleric acid, 12-hydroxystearic acid, 12-hydroxydecanoic acid, 5-hydroxydodecanoic acid, 5-hydroxydecanoic acid and 4-hydroxydecanoic acid. Examples of lactones from which A is derivable are β-propiolactone, optionally alkyl-substituted ε-caprolactone and optionally alkyl-substituted δ-valerolactone. The alkyl substituent(s) in the ε-caprolactone or δ-valerolactone is preferably $C_{1-6}$-alkyl and especially $C_{1-4}$-alkyl. The alkyl substituted ε-caprolactone is obtainable by the oxidation of alkyl substituted cyclohexanone as described in WO 98/19784. Specific examples are 7-methyl, 3-methyl, 5-methyl, 6-methyl, 4-methyl, 5-tert-butyl, 4,6,6-trimethyl and 4,4,6-trimethyl ε-caprolactone.

It is much preferred that A contains a $C_{1-6}$-alkylene chain optionally substituted by $C_{1-6}$-alkyl and is especially ε-caprolactone.

The cyclic alkylene carbonate from which B is derivable preferably contains a 5- or especially a 6-membered ring. It is preferably a cyclic trimethylene carbonate optionally substituted by $C_{1-6}$-alkyl, cycloalkyl, gem. cycloalkyl, $C_{2-6}$-alkenyl, $C_{1-6}$-alkyl oxy-$C_{1-6}$-alkyl and $C_{2-4}$-alkenyl oxy-$C_{1-6}$-alkyl groups. Specific examples are trimethylenecarbonate, 5,5-dimethyltrimethylenecarbonate, 5,5-diethyltrimethylenecarbonate, 5-ethyl-5-methyltrimethylenecarbonate, 5-methyl-5-propyltrimethylenecarbonate, 5-ethyl-5-butyl trimethylene carbonate, 5-methyl trimethylene carbonate, 5,5-cyclohex-3-enyl trimethylene carbonate and 5-ethyl-5-alloxymethyltrimethylene carbonate.

The ratio of m to n may vary over a wide range depending whether the final dispersant is for use in a polar or non-polar liquid medium. Preferably the ratio of m to n is from 6:1 to 1:6. However, it is much preferred that m is greater than n.

Preferably m+n is not greater than 100, more preferably not greater than 50 and especially not greater than 20. It is also preferred that m+n is not less than 4.

When Z is an acidic group it is preferably a sulphate or phosphate group. The phosphate may be a mono-, di- or tri-phosphate or mixture thereof and is preferably obtainable by reacting from 1 to 3 moles of TPOAC alcohol with each phosphorus atom of a phosphating agent. The phosphate dispersant may also be obtained by reacting the TPOAC alcohol with an excess of phosphating agent such as polyphosphoric acid to give a dispersant which contains a polyphosphorus moiety which is believed to involve pyrophosphates. Although a 5:1 excess of phosphorus in the phosphating agent to each mole of TPOAC may be used there is generally no benefit over a 3:1 excess.

When Z is a basic group or a moiety containing a basic group it is preferably the residue of a polyamine or polyimine. Examples of polyamines are polyallylamine and polyvinylamine. The polyimine is preferably poly ($C_{2-6}$-alkyleneimine) (hereinafter PAI) and especially polyethyleneimine (hereinafter PEI). The polyimine may be linear or preferably branched. Linear PEI's can be prepared by hydrolysis of poly (N-acyl) alkyleneimines as described, for example, by Takeo Saegusa et al in Macromolecules, 1972, vol 5, page 4470. The branched PEI's of differing molecular weights are commercially available from BASF and Nihon Shokubai. Polyallylamine and poly (N-alkyl) alkylamines of differing molecular weights are commercially available from Nitto Boseki. Polyvinylamine of differing molecular weights are available from Mitsubishi Kasei. Poly(propyleneimine) dendrimers are commercially available from DSM Fine Chemicals and poly(amidoamine) dendrimers are available as "Starburst" dendrimers from Aldrich Chem.Co.

When Z is an acidic group or a moiety containing an acidic group and the dispersant is in the form of a salt, the salt is preferably that of an alkali metal such as lithium, potassium and sodium, including mixtures thereof; the salt of an alkaline earth metal such as calcium, magnesium and barium, including mixtures thereof or the salt of ammonia, an amine or quaternary ammonium cation. Examples of suitable amines are n-butylamine, ethanolamine, diethanolamine, triethanolamine, aminopropanol, triethylamine, dimethylaminoethanol and dimethylaminopropylamine.

When Z is a basic group or a moiety containing a basic group, the dispersant of formula 1 may be in the form of a salt of a coloured acid. By the term "coloured acid" is meant an organic pigment or dyestuff containing at least one, preferably from 1 to 6 acid groups, especially sulphonic, phosphonic and carboxylic acid groups. A preferred coloured acid is copper phthalocyanine or other deeply coloured pigment and especially sulphonated copper phthalocyanine containing, on average, from 0.5 to 3 sulphonic acid groups per molecule. The basic group may also be in the form of a salt of an organic acid such as methylsulphate or in the form of a quaternary ammonium salt where any groups in the polyamine or polyimine not carrying a POAC chain are reacted with an alkylating agent such as a dialkylsulphate, for example, dimethylsulphate.

According to a first aspect of the invention there is provided a dispersant which is a phosphate or sulphate ester of a polyester of formula 2.

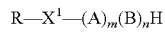   2 wherein

R is optionally substituted hydrocarbyl;

$X^1$ is —O—, —S—, —$NR^1$— or —CO—; and

A, B, $R^1$, m and n are as defined hereinbefore.

As discussed hereinafter, under certain conditions $CO_2$ is lost during the polymerisation of the hydroxycarboxylic acid or lactone thereof and the cyclic alkylene carbonate and consequently the dispersant according to the first aspect of the invention may be regarded as the phosphate or sulphate ester of a polyester of formula 2a

   2a wherein

R, $X^1$, m and n are as defined hereinbefore;

$A^1$ is optionally substituted $C_{1-50}$-alkylene or $C_{2-50}$-alkenylene; and $B^1$ is propylene optionally substituted by $C_{1-6}$-alkyl.

According to a second aspect of the invention there is provided a dispersant comprising a polyamine or polyimine carrying at least two POAC chains of formula 3 which are linked to the polyamine or polyimine by amide and/or salt linkages.

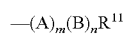   3 wherein

A, B, m and n are as defined hereinbefore; and $R^{11}$ is hydrogen, alkyl, aryl or acyl Again, as discussed hereinafter, under certain conditions $CO_2$ is lost during the polymerisation of the hydroxycarboxylic acid or lactone thereof and the cyclic alkylenecarbonate and consequently the dispersant according to the second aspect of the invention may be regarded as a polyamine or polyimine carrying at least two POAC chains of formula 3a which are linked to the polyamine or polyimine via amide and/or salt linkages.

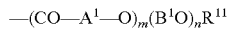   3a wherein $A^1$, $B^1$, $R^{11}$, m and n are as defined hereinbefore.

Each POAC chain is linked to the polyamine or polyimine through either a covalent link —CON═formed between a terminal carbonyl group of the POAC chain and a nitrogen atom of a primary or secondary amine group in the polyamine or polyimine or through an ionic salt linkage —COO⁻HN+═formed between a terminal carboxylate group of the POAC chain and a positively charged nitrogen atom of a substituted ammonium group in the polyamine or polyimine. Because the dispersant contains at least two POAC chains it may contain a mixture of amide and salt linkages depending on the severity of the reaction conditions used in its preparation.

The dispersant of the second aspect of the invention may also be conveniently represented by formula 4.

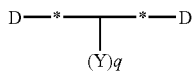   4 wherein

D—*—*—D represents the polyamine or polyimine;

Y represents a POAC chain linked to the polyamine or polyimine via amide and/or salt linkages;

q is from 2 to 2000; and

POAC is as defined hereinbefore.

Preferably, q is not less than 4 and especially not less than 10. It is also preferred that q is not greater than 1000 and especially not greater than 500.

It is also preferred that the weight ratio of the POAC chain represented by Y to the polyamine or polyimine represented by D—*—*—D is from 30:1 to 1:1, more preferably from 20:1 to 3:1 and especially from 17:1 to 7:1.

The polyimine is preferably PEI.

The polyamine or polyimine preferably has a number average molecular weight from 500 to 600,000, more preferably from 1000 to 200,000 and especially from 1,000 to 100,000.

The POAC chains $(A)_m(B)_n$ and $(OC—A^1—O)_m(B^1—O)_n$ of formulae 2, 2a and 3/3a, respectively are obtainable by reacting one or more hydroxycarboxylic acids, or lactones thereof with one or more cyclic aliphatic carbonates optionally in the presence of a polymerisation terminating compound and in the presence of an esterification catalyst at 50 to 250° C. in an inert atmosphere. Preferably the temperature is not less than 100° C. and especially not less than 150° C. In order to reduce the possibility of charring the temperature is preferably not greater than 200° C. and especially not greater than 180° C. The inert atmosphere may be provided by any gas of the Periodic Table according to Mendeleef but is preferably nitrogen. The esterification catalyst may be a tetra-alkyl titanate, for example tetrabutyl titanate, a zinc salt of an organic acid, such as zinc acetate, a zirconium salt of an aliphatic alcohol, for example zirconiumbutylate, toluene sulphonic acid or a strong acid such as trifluoroacetic acid or sulphuric acid. The product of this esterification process is either TPOAC alcohol or TPOAC acid depending on the nature of the polymerisation terminating compound. Where the polymerisation terminating compound contains a hydroxy, thiol, amino or carboxy group, the product of this esterification process is a TPOAC alcohol.

When the hydroxycarboxylic acid or lactone thereof is polymerised with the cyclic alkylenecarbonate in the absence of a polymerisation terminating compound the resultant POAC chain contains both a terminal —OH and terminal —COOH group. Clearly, the terminal —COOH group may be reacted with a polymerisation terminating compound containing a —OH, —SH or —NHR¹— group to give a TPOAC alcohol although it is much preferred to form the TPOAC alcohol by polymerising the hydroxycarboxylic acid or lactone thereof with the cyclic alkylene carbonate in the presence of the polymerisation terminating compound. Where the POAC chain contains both a terminal —OH group and a terminal —COOH group, the —OH group may also be reacted with a polymerisation terminating compound such as a carboxylic acid to form a TPOAC acid. As a further variant and in the case of the dispersants according to the second aspect of the invention, the polyamine or polyimine itself can act as the polymerisation terminating compound.

When the hydroxy carboxylic acid and or lactone thereof is reacted with the cyclic alkylene carbonate the resulting POAC chain contains ether, ester and carbonate groups. The ether groups arise from loss of carbon dioxide from the cyclic alkylene carbonates and the extent of loss of carbon dioxide is influenced by the nature of any esterification catalyst used. The esterification catalyst may be a metal salt such as zirconium butylate or a strong organic or inorganic acid or a Lewis acid. Examples of strong acids are trifluoroacetic acid, sulphuric acid and phosphoric acid. When the polymerisation terminating group is derived from a hydroxy carboxylic acid the choice of esterification catalyst also influences whether the esterification occurs via the hydroxy group or the carboxy group of the hydroxy carboxylic acid. When a strong acid catalyst is used the esterification occurs almost exclusively via the hydroxy group. When a metal catalyst is used the esterification of the hydroxy carboxylic acid occurs at both the terminating hydroxy and carboxylic acid groups. In both instances a POAC chain is produced having both terminal hydroxy and carboxy groups.

The cyclic alkylene carbonates from which B is derived are obtainable by reacting diethyl carbonate with the appropriate diol at a temperature from 120 to 200° C. in the presence of an organic tin salt such as stannous 2-ethylhexanoate to give an optionally substituted poly(trimethylene carbonate). This may be used directly in the preparation of the dispersants according to the invention when the POAC chain constitutes a block copolymer. Alternatively, the optionally substituted poly(trimethylene carbonate) may be thermally depolymerised and the optionally substituted trimethylene carbonate may be used to prepare a random POAC chain.

Thus, according to a further aspect of the invention there is provided a process for making a dispersant of formula 1 which comprises reacting one or more hydroxycarboxylic acids or lactone thereof with one or more cyclic alkylenecarbonates optionally in the presence of a polymerisation terminating compound in an inert atmosphere and in the presence of an esterification catalyst.

The TPOAC alcohol may be converted to a sulphate or phosphate ester by reacting with sulphuric acid, chlorosulphonic acid or a phosphating agent such as polyphosphoric acid, $P_2O_5$ or $POCl_3$. This reaction is more facile than the esterification reaction and is generally carried out at temperatures from 70 to 100° C. As disclosed hereinbefore, the ratio of TPOAC alcohol to each phosphorus atom of the phosphating agent may vary from 3:1 to 1:3 depending whether the dispersant required is a mono-, di- or triphosphate or a mixture thereof or whether it contains a polyphosphorus moiety such as pyrophosphate. Mixtures of phosphates are much preferred.

The TPOAC acid may be reacted with a polyamine or polyimine under similar conditions to those employed in making the TPOAC acid although the presence of an esterification catalyst is not required.

The TPOAC alcohols which are used to prepare the dispersants according to the first aspect according to the invention are novel. Hence, according to a still further aspect according to the invention there is provided a compound of formulae 2 and 2a.

According to a still further aspect of the invention there is provided a TPOAC acid of formula 5 and 5a.

$$HO(A)_m(B)_n\text{---}R^{11} \qquad 5$$

$$HO(CO\text{---}A^1\text{---}O)_m(B^1\text{---}O)_n\text{---}R^{11} \qquad 5a$$

wherein A, B, $A^1$, $B^1$, $R^{11}$, m and n are as defined herein before. Preferably, $R^{11}$ is free from ethylenically unsaturated groups.

As noted hereinbefore, the dispersants are particularly useful for dispersing a particulate solid in an organic medium.

According to a further aspect of the invention there is provided a composition comprising a particulate solid and a dispersant of Formula 1.

According to a still further aspect of the invention there is provided a dispersion comprising a dispersant of Formula 1, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petroleum distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid® and Wolfamid®, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multimedia resins such as acrylic and urea/aldehyde.

The resin may also be a plastics material such as an unsaturated polyester resin including the so-called sheet moulding compounds and bulk moulding compounds which may be formulated with reinforcing fibres and fillers. Such moulding compounds are described in DE 3,643,007 and the monograph by P F Bruins entitled "Unsaturated Polyester Technology", Gordon and Breach Science publishers, 1976, pages 211 to 238. Examples of polyester resins are those where a unsaturated polyester resin is copolymerised with polystyrene or styrene-butadiene copolymer and especially those containing calcium carbonate, magnesium oxide or aluminium hydroxide. The resin may also be an acrylic, styrene-acrylic or urethane-acrylic resin.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants may also be used to disperse a particulate solid in a plastics material, especially a thermo-setting plastics material. Examples of suitable plastics materials are polyolefins, polyamides, polyurethanes, polyacrylates and polyesters.

The dispersants of the present invention exhibit advantage over known dispersants derived from $\epsilon$-caprolactone. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4-10° C. When incorporated into paints and painting inks, the dispersants of the present invention give rise to higher gloss readings lower haze values, lower viscosity and/or improved flocculation properties in the resultant paints and inks.

The invention is further illustrated by the following examples wherein all references to amounts are in parts by weight unless indicated to the contrary.

The cycloalkylene carbonates were prepared according to the method described by T. Endo et al in Macromolecules 1997, 30, 737.

5.5-dimethyl trimethylene carbonate

Triethylamine (24.56 parts, 242 mM ex Fisher) was added dropwise to a stirred solution of 2,2-dimethyl-1,3-propanediol (12 parts, 115 mM ex Aldrich) and ethyl chloroformate (24.91 parts, 230 mM ex Aldrich) dissolved in tetrahydrofuran (260 ml) at 0° C. over 30 min under nitrogen. The reactants were then stirred at 20° C. for 2 hours and filtered to remove the triethylamine hydrochloride. The solvent was then removed giving a white solid which was slurried in diethylether (100 ml) at 0° C. and filtered (9.50 parts) Mp 85-87° C.

The cyclo alkylene carbonates below were made in similar manner by replacing the 2,2-dimethyl-1,3-propanediol with an equivalent amount of the diol indicated.

| Carbonate | Diol |
|---|---|
| 5-methyl trimethylene carbonate | 2-methyl-1,3-propanediol |
| 5,5-cyclohex-3-enyltrimethylene carbonate | 3-cyclohexene-1,1-dimethylol |
| 5-ethyl-5-allyoxymethyl trimethylene carbonate | trimethylol propane monoallylether |
| 5-methyl-5-propyl trimethylene carbonate | 2-methyl-2-propyl-1,3-propane diol |
| 5-ethyl-5-butyl trimethylene carbonate | 2-ethyl-2-butyl-1,3-propane diol |
| 5,5-diethyl trimethylene carbonate | 2,2-diethyl-1,3-propane diol |

Acid Dispersants

EXAMPLE 1

Do1, cap 12, DTC 6; 3:1 P

Zirconium butylate (0.3 parts as 80% (w/w) solution in n-butanol, ex ABCR) was added to a mixture of ε-caprolactone (37.14 parts, 326 mM ex Aldrich), n-dodecanol (5 parts, 27 mM ex Aldrich) and 5,5-dimethyltrimethylene carbonate (21.18 parts, 163 mM ex Lancaster) with stirring under nitrogen at 140° C. The temperature was then raised to 180° C. and the reactants were stirred under nitrogen for a further 6 hours at this temperature. After cooling the TPOAC alcohol was obtained as a colourless liquid (58 parts).

Polyphosphoric acid (2.44 parts, containing 83% (w/w) $P_2O_5$, mM ex Fluka) was added to the above TPOAC alcohol (50 parts, 21.4 mM) with stirring under nitrogen at 80-85° C. The temperature was then raised to 90-95° C. and the reactants stirred under nitrogen for a further 6 hours. After cooling, the product was obtained as a pale yellow viscous oil (45 parts). This is Dispersant 1.

EXAMPLE 2

Is 14T 1, cap 10, DTC 2.5; 1.5:1 P; DEA

Zirconium n-butylate (0.3 parts ex Fluka) was added to mixed branched alcohols (5 parts, 23 mM, Isofol 14T ex Condea Chemie GmbH), ε-caprolactone (26.29 parts, 230 mM ex Aldrich) and 5,5-dimethyltrimethylene carbonate (7.5 parts, 57.6 mM ex Lancaster) with stirring at 140° C. under a nitrogen atmosphere. The temperature was then raised to 180° C. and the reaction continued for 6 hours. An aliquot exhibited an Acid Value of 0 mg KOH/gm indicating complete polymerisation.

After cooling to 90° C., polyphosphoric acid (2.59 parts, 18.3 mM, 83% (w/w) $P_2O_5$ ex Fluke) was added and the reactants were stirred for 6 hours at 90° C. under nitrogen. The Acid Value of the phosphate ester of the TPOAC was 49.69 Ag KOH/gm. The phosphate ester was then converted to an amine salt by adding diethanolamine (3.58 parts, 34 mM ex Aldrich) and the mixture was stirred at 90° C. for 1 hour. After cooling to 25° C. the product was obtained as a viscous gum (40 parts). This is Dispersant 2.

EXAMPLES 3 to 18

The dispersants listed in Table 1 below were made by an analogous method to Dispersant 2, Example 2 using the indicated starting alcohol, lactone and cyclic alkylene carbonate. The figures in the columns following the legend identifying the alcohol, lactone and carbonate are molar amounts. In the column headed "Phosphating Agent" the figures following the legend identifying the phosphating agent are the molar ratio of the TPOAC alcohol to phosphorus atom of the phosphating agent. Note that in the case of Examples 17 and 18, Dispersants 17 and 18, the polymerisation terminating group is an aliphatic acid and not an alcohol.

TABLE 1

| | | TPOAC Alcohol | | | Phosphating | Acid Value MgKOH/ | |
|---|---|---|---|---|---|---|---|
| Example | Dispersant | Alcohol | lactone | carbonate | Agent | gm | Amine |
| 3 | 3 | Do1 | ε-cap 9 | DTC 3 | PPA 1.5:1 | 48.33 | DEA |
| 4 | 4 | Oc1 | ε-cap 8 | DTC 4 | PPA 3:1 | 52.19 | DEA |
| 5 | 5 | Is 18T 1 | ε-cap 12 | MPTC 3 | PPA 2.3:1 | 35.35 | DEA |
| 6 | 6 | EtHe 1 | ε-cap 8 | DTC 4 | PPA 2.5:1 | 30.04 | TEA |
| 7 | 7 | Is 24 1 | ε-cap 10 | DTC 2 | PPA 2.75:1 | 25.41 | DEA |
| 8 | 8 | Et Bu 1 | ε-cap 9 | MPTC 3 | PPA 2:1 | 35.52 | DMAE |
| 9 | 9 | 2-Bu 1 | ε-cap 3 | DTC 3.5 | PPA 2.7:1 | 26.83 | DEA |
| 10 | 10 | Is 36 1 | ε-cap 8 | DTC 2 | PPA 3:1 | 30.08 | DEA |
| 11 | 11 | Is 16 1 | ε-cap 4 | DTC 1 | PPA 2.25:1 | — | — |
| 12 | 12 | Oc 1 | ε-cap 6 | MPTC | PPA 2.5:1 | — | — |
| 13 | 13 | Is 14T 1 | δ-val 10 | 1.5 | PPA 2.5:1 | 37.38 | DEA |
| 14 | 14 | TEGME 1 | ε-cap 3 | MPTC | PPA 3:1 | — | — |
| 15 | 15 | Oc De 1 | ε-cap 8 δ-val 2 | 2.5 DTC 1 | PPA 2:1 | | DEA |
| 16 | 16 | Oc1 | ε-cap 8 δ-val 1 4-Mecap 1 | MPTC 2 DTC 2 | PPA 3:1 | | DMAE |
| 17 | 17 | LA 1 | ε-cap 12 | | PPA 2.5:1 | | DEA |

TABLE 1-continued

| Example | Dispersant | TPOAC Alcohol Alcohol | lactone | carbonate | Phosphating Agent | Acid Value MgKOH/gm | Amine |
|---|---|---|---|---|---|---|---|
| 18 | 18 | MAA1 | ε-cap 10 δ-val 2 | DTC 3 MPTC 2.5 | PPA 2.25:1 | | DEA |

Footnote Table 1
Do is n-dodecanol ex Aldrich
Oc is n-octanol ex Aldrich
Is 18T is Isofol 18T ex Condea Chemie GmbH
Et He is 2-ethylhexanol ex Aldrich
Is 24 is Isofol 24 ex Condea Chemie GmbH
Et Bu is 2-ethylbutanol ex Aldrich
2-Bu is 2-butanol ex Fisher
Is 36 is Isofol 36 ex Condea Chemie GmbH
Is 16 is Isofol 16 ex Condea Chemie GmbH
Oc is n-octanol ex Aldrich
Is 14T is Isofol 14 T ex Condea Chemie GmbH
TEGME is triethyleneglycolmonomethylether ex Aldrich
Oc De is octadecanol ex Aldrich
LA is lauric acid ex Aldrich
MAA is methoxy acetic acid ex Aldrich
ε-cap is ε-caprolactone ex Aldrich
δ-val is δ-valerolactone ex Fluka
4-Mecap is 4-methyl-ε-caprolactone ex WO 98/19784
DMAE is dimethylaminoethanol ex Aldrich
DTC is 5,5-dimethyltrimethylenecarbonate ex Lancaster
MPTC is 5-methyl-5-propyltrimethylenecarbonate ex Sigma
PPA is polyphosphoric acid containing 83% ($^w/_w$) $P_2O_5$ ex Fluka
DEA is diethanolamine ex Aldrich
TEA is triethanolamine ex Aldrich

EXAMPLE 19

Doa1, cap 8, DTC 2; 2.25 S; DMEA n-Dodecylamine (3.56 parts, 0.0192M ex Aldrich), ε-caprolactone (17.54 parts, 0.154M ex Aldrich) and 5,5-dimethyltrimethylenecarbonate (5 parts, 0.0384M ex Lancaster) were stirred together under nitrogen at 150° C. Zirconium butylate (0.2 parts ex Fluka) was added and the temperature was raised to 175-180° C. The reaction was continued by stirring under nitrogen at 180° C. for 6 hours. After cooling to 90° C., concentrated sulphuric acid (0.83 parts) was added and the reaction continued with stirring for 6 hours at 90° C. The Acid Value of the TPOAC alcohol was 38.15 mg KOHgm. Dimethylaminoethanol (1.5 parts ex Aldrich) was added and the reaction mixture was stirred for 3 hours at 90° C. After cooling to 25° C. the product was obtained as a white wax (24 parts). This is Dispersant 19.

EXAMPLE 20

The dispersant (2 parts) was dissolved in toluene (10 parts) and the solubility determined visually after storing at 25° C. for 16 hours, after storage for 3 days at 4° C., after storage for 5 days at −10° C. and after storage for 5 days at −10° C. and warming to 25° C. The results are given in Table 2 below.

TABLE 2

| Dispersant | Storage at 25° C. | 3 days at 4° C. | 5 days at −10° C. | 5 days at −1-° C. then 25° C. |
|---|---|---|---|---|
| 1 | clear | clear | clear | clear |
| 2 | clear | clear | clear | clear |
| 3 | clear | clear | clear | clear |
| 4 | clear | clear | clear | clear |
| 5 | clear | clear | clear | clear |
| 6 | clear | clear | clear | clear |
| 7 | clear | clear | f. crystals | clear |
| 8 | sl. hazy | clear | clear | clear |
| 9 | clear | clear | f. crystals | clear |
| 10 | clear | clear | hazy | clear |
| 13 | clear | clear | clear | clear |
| 15 | clear | clear | clear | clear |
| 16 | clear | clear | clear | clear |
| 17 | clear | clear | clear | clear |
| 18 | clear | clear | clear | clear |
| 19 | clear | f. crystals | f. crystals | clear |
| Control | sl. hazy | crystals | gelled | crystals |

Footnote to Table 2
sl is slight and f is few
Control is the phosphate ester of a TPOAC alcohol prepared by polymerising ε-caprolactone in the presence of lauryl alcohol ex EP 164,817.

EXAMPLE 21

White Pigment Millings

The dispersant (0.2 parts) was dissolved in a 4:1 (w/w) mixture of methoxypropylacetate and n-butanol (7.5 parts). Titanium dioxide white pigment (7.5 parts, Tioxide TR 92) was added together with 3 mm diameter glass beads (17 parts) and the mixture was milled on a horizontal shaker for 16 hours. The fluidity of the resultant dispersion was assessed using an arbitrary scale A to E (good to bad). The results are given in Table 3 below.

TABLE 3

| Dispersant | Fluidity |
| --- | --- |
| 1 | C |
| 2 | B |
| 3 | B |
| 4 | C |
| 5 | C |
| 6 | C |
| 7 | B/C |
| 8 | C |
| 9 | B |
| 10 | C |
| 13 | C |
| 15 | B |
| 16 | B |
| 17 | B |
| 18 | B |
| 19 | B/C |
| Control | C/D |

Footnote to Table 3
Control is a phosphate ester of a TPOAC alcohol obtained by polymerising ε-caprolactone in the presence of lauryl alcohol.

EXAMPLE 22

Red Iron Oxide Pigment Millings

Example 17 was repeated except using dispersant (0.25 parts), red iron oxide pigment (3 parts, Sicotrans Red L2817 ex BASF) and solvent mixture (6.75 parts) in place of the amounts shown in Example 17. The results are given in Table 4 below.

TABLE 4

| Dispersant | Fluidity |
| --- | --- |
| 1 | B/C |
| 2 | B |
| 3 | B |
| 4 | C |
| 5 | C/D |
| 6 | C/D |
| 7 | C/D |
| 8 | C/D |
| 9 | C/D |
| 10 | D |
| 13 | C/D |
| 15 | C |
| 16 | C |
| 17 | C |
| 18 | B/C |
| 19 | D |
| Control | D |

Footnote to Table 4
Control is as disclosed in the footnote to Table 3.

Basic Dispersants

EXAMPLE 23

Gly 1, ε-cap 10, MTC 3, PE1(12:1)

Glycolic acid (1.67 parts 0.022M ex Aldrich), ε-caprolactone (25 parts, 0.22M ex Aldrich) 5-methyl trimethylene carbonate (7.63 parts, 0.066 M) were stirred together at 100° C. under nitrogen. Orthophosphoric acid (0.13 parts) was added and polymerisation was effected by stirring for a further 10 hours at 100° C. under nitrogen. The resultant TPOAC acid was obtained as a pale yellow liquid. Polyethylene imine SP 200 (2.78 parts, MW 10,000 ex Nippon Shokubai) was added and the temperature was raised to 120° C. and the reactants were stirred together under nitrogen for 6 hours at 120° C. After cooling to 20° C., the product was obtained as a beige wax (35 parts). This is Dispersant 20.

EXAMPLES 23 to 27

Example 23 was repeated to prepare the dispersants listed in Table 5 below where numbers in the column headed TPOAC acid indicate the molar amounts of the starting materials used and where the ratio of TPOAC acid to polyamine/polyimine is in parts by weight.

TABLE 5

| Example | Dispersant | TPOAC acid | | Ratio of TPOAC acid to polyamine/polyimine |
| --- | --- | --- | --- | --- |
| 23 | 21 | Gly 1, cap 9, EAT 4 | SP 050 | 10:1 |
| 24 | 22 | Gly 1, cap 8, EBT 4 | SP 300 | 15:1 |
| 25 | 23 | Gly 1, cap 8, EBT 4 | PAA | 15:1 |
| 26 | 24 | Gly 1, cap 12, MPT 3 | SP 030 | 17:1 |
| 27 | 25 | HMP 1, cap 9, MTC 3 | SP 050 | 13:1 |

Footnote to Table 5:
Gly is glycolic acid ex Aldrich
cap is ε-caprolactone ex Aldrich
EAT is 5-ethyl-5-allyloxy methyltrimethylene carbonate
EBT is 5-ethyl-5-butyl trimethylene carbonate
HMP is 2,2-bis (hydroxymethyl)propionic acid ex Aldrich
MPT is 5-methyl-5-propyl trimethylene carbonate
MTC is 5-methyl trimethylene carbonate
SP 050 is poly(ethylene imine) MW 5,000 ex Nippon Shokubai
SP 300 is poly(ethylene imine) MW 20,000 ex Nippon Shokubai
SP 030 is poly(ethylene imine) MW 3,000 ex Nippon Shokubai
PAA is polyallylamine MW 17,000 ex Aldrich

EXAMPLE 28

The dispersant (0.45 parts) was dissolved in a 4:1 mixture of methoxy propylacetate and n-butanol (7.55 parts). 3 mm diameter glass beads (16 parts) and red pigment (2 parts Monolite Rubine 3B ex Avecia) were added and the mixture was milled in a horizontal shaker for 16 hours. The beads were then removed and the viscosity of the resulting dispersion was assessed by hand shaking using an arbitrary scale of A to E (good to poor). The results are given in Table 6 below.

TABLE 6

| Dispersant | Viscosity |
| --- | --- |
| 20 | C |
| 21 | C |
| 22 | C |
| 23 | C |
| 24 | C |
| 25 | C |

EXAMPLE 29

RLM 45 1, cap 9, CHT 2, 2.5:1 P

Polyethylene glycol mono methyl ether methylene carboxylic acid (10 parts, 0.0217M Akypo RLM 45 ex Koa Chemicals GmbH), ε-caprolactone (22.33 parts, 0.196M ex Aldrich) and 5,5-cyclohex-3-enyl trimethylene carbonate (7.3 parts, 0.043M) were stirred under nitrogen at 150° C. Zirconium butylate (0.3 parts ex Fluka) were added and the reactants were stirred under nitrogen at 175-180° C. for 10 hours. After cooling to 90-95° C., polyphosphoric acid (1.51 parts) was added and the reaction was continued by stirring at 90-95° C. for 6 hours. The product was obtained as a yellow viscous gum (35 parts) after cooling to 20° C. This is Dispersant 26.

The invention claimed is:

1. A dispersant which is represented by formula 4

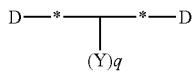

(4)

wherein D—*—*D represents the polyamine or polyimine;
Y represents a polyoxy alkylene carbonyl chain (POAC) represented by the group $T-X-(A)_m(B)_n-$ which is linked to the polyamine or polyimine via amide and/or salt linkages; and q is from 2 to 2000;
T is H or a residue of a polymerization terminating group selected from $C_{1-50}$ hydrocarbyl groups:
X is a direct bond or a divalent bridging group;
A is a residue of one or more optionally substituted $C_{1-50}$-alkylene or $C_{2-50}$-alkenylene hydroxycarboxylic acids or lactones thereof;
B is a residue of one or more cyclic alkylene carbonates characterized by 6 atoms in the ring portion;
m and n are positive integers: and m+n is from 2 to 200.

2. A dispersant as claimed in claim 1 wherein the weight ratio of the POAC chain represented by Y to the polyamine or polyimine is from 30:1 to 1:1.

3. A dispersant as claimed in either claim 1 or claim 2 wherein the polyimine is polyethyleneimine.

4. A process for making a dispersant as claimed in claim 1 which comprises reacting one or more hydroxycarboxylic acids or lactones thereof with one or more cyclic alkylene carbonates optionally in the presence of a polymerization terminating compound in an inert atmosphere and in the presence of an esterification catalyst at a temperature from 50 to 250° C. to form said POAC, followed by reacting with the polyamine or polyimine.

5. A composition comprising a particulate solid and a dispersant as claimed in claim 1.

6. A composition comprising a particulate solid, an organic medium and a dispersant as claimed in claim 1.

7. A millbase, paint or ink comprising a pigment, organic medium, film-forming resin binder and a dispersant as claimed in claim 1.

8. A composition comprising a particulate solid, a plastic material and a dispersant as claimed in claim 1.

* * * * *

UNITED STATES PATENT AND TRADEMARK OFFICE
CERTIFICATE OF CORRECTION

| | | |
|---|---|---|
| PATENT NO. | : 7,361,692 B2 | Page 1 of 1 |
| APPLICATION NO. | : 10/474306 | |
| DATED | : April 22, 2008 | |
| INVENTOR(S) | : Thetford | |

It is certified that error appears in the above-identified patent and that said Letters Patent is hereby corrected as shown below:

In column 17, claim 1, line 11, please delete "D-*-*D" and insert -- D-*-*-D --.

In column 17, claim 1, line 13, please delete "T-X-$(A)_m(B)_n$-" and insert -- T-X-$(A)_m$-$(B)_n$- --.

In column 17, claim 1, line 24, delete ":" and insert -- ; --.

Signed and Sealed this

Twentieth Day of April, 2010

David J. Kappos
*Director of the United States Patent and Trademark Office*